(12) United States Patent
Hasegawa

(10) Patent No.: US 7,189,910 B2
(45) Date of Patent: Mar. 13, 2007

(54) MUSICAL TONE SIGNAL-GENERATING APPARATUS AND CONTROL PROGRAM THEREFOR

(75) Inventor: Yutaka Hasegawa, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 105 days.

(21) Appl. No.: 10/839,481

(22) Filed: May 5, 2004

(65) Prior Publication Data

US 2004/0221708 A1 Nov. 11, 2004

(30) Foreign Application Priority Data

May 6, 2003 (JP) .............................. 2003-128006

(51) Int. Cl.
G10H 7/00 (2006.01)
(52) U.S. Cl. .................... 84/601; 709/221; 709/232
(58) Field of Classification Search ................. 84/601, 84/609, 615, 604, 610; 709/221, 232
See application file for complete search history.

(56) References Cited

U.S. PATENT DOCUMENTS

| 2003/0029303 A1 | 1/2002 | Hasegawa et al. |
| 2002/0002896 A1 | 7/2002 | Hasegawa |
| 2003/0079038 A1* | 4/2003 | Robbin et al. ............... 709/232 |
| 2003/0167318 A1* | 9/2003 | Robbin et al. ............... 709/221 |

FOREIGN PATENT DOCUMENTS

| JP | 04172584 | 6/1992 |
| JP | 2002023607 | 1/2002 |
| JP | 2003015934 | 1/2003 |
| JP | 2003-58160 | 2/2003 |

OTHER PUBLICATIONS

Google Search Engine, define: server;, http://www.google.com/search?hl=en&lr=&rls=GGLD%2CGGLD%3A2004-30%2CGGLD%3Aen&q=define%3A+server, © 2005 Google.*
J.D. Biersdorfer, iPOD &iTunes: The Missing Manual, 2nd Edition, Feb. 2004, O'Reilly, Sections 1.6, 2.6, 6.2 and 6.5.*

* cited by examiner

Primary Examiner—Lincoln Donovan
Assistant Examiner—Christina Russell
(74) Attorney, Agent, or Firm—Harness, Dickey & Pierce, PLC

(57) ABSTRACT

A musical tone signal-generating apparatus which is capable of easily reflecting user's settings on the apparatus based on user's usage data by a simple operation using a portable storage medium storing the user's usage data customized on a user-by-user basis. A server, which stores users' usage data concerning use of the apparatus, on a user-by-user basis. The user's usage data concerning the use of the musical tone signal-generating apparatus by a user is read from and written into a portable storage medium. When mounting of the storage medium in said reading and writing device is detected, the users' usage data associated with the user stored in the server and the user's usage data stored in the storage medium are compared to determine which is a newer one. The newer one of the users' usage data associated with the user stored in the server and the user's usage data stored in the storage medium is enabled, based on a result of the comparison.

6 Claims, 10 Drawing Sheets

_US 7,189,910 B2_

MUSICAL TONE SIGNAL-GENERATING APPARATUS AND CONTROL PROGRAM THEREFOR

BACKGROUND OF THE INVENTION

1. Field of the Invention

The present invention relates to a musical tone signal-generating apparatus, such as an electronic musical instrument used for musical training or the like, and a control program therefor, and particularly to a musical tone signal-generating apparatus and a control program therefor which are capable of easily reflecting various user's settings thereon using user's usage data stored in a portable storage medium.

2. Description of the Related Art

Conventionally, it has been proposed to customize the settings of a single electronic musical instrument shared by a plurality of users e.g. in a music class, on a user-by-user basis, so as to make the environment of the instrument suitable for each user, e.g. in Japanese Laid-Open Patent Publication (Kokai) No. 2003-58160. According to this patent publication, information of user-specific settings is stored in the instrument. Further, there has also been proposed a technique of causing an electronic musical instrument to store tone color information, registration data, and musical composition data, in a portable storage medium, so as to allow another electronic musical instrument to use the tone color information, the registration data, and the musical composition data, by reading these data from the portable storage medium.

In this conventional technique, however, the portable storage medium that stores information for use in setting up an electronic musical instrument is limited to an only one type, and therefore, when another electronic musical instrument is not compatible with the storage medium, it is impossible for this instrument to use the information. Further, even when an electronic musical instrument uploads information for use in setting up the instrument to a server through network communication, another electronic musical instrument which is not equipped with the network communication function is not capable of downloading the information from the server, which makes it impossible for this instrument to use the information.

Furthermore, for the other electronic musical instrument to use the information obtained from the storage medium or the server, the user has to carry out a command operation for gaining access to the storage medium or the server, retrieve proper information from information available from the storage medium or the server, and then give an instruction for downloading the proper information, which requires time and labor.

SUMMARY OF THE INVENTION

It is an object of the present invention to provide a musical tone signal-generating apparatus and a control program therefor, which are capable of easily reflecting user's settings on the apparatus based on user's usage data by a simple operation using a portable storage medium storing the user's usage data customized on a user-by-user basis.

To attain the above object, in a first aspect of the present invention, there is provided a musical tone signal-generating apparatus comprising a connecting device that connects to a server storing users' usage data concerning use of the musical tone signal-generating apparatus, on a user-by-user basis, a reading and writing device that reads and writes user's usage data concerning the use of the musical tone signal-generating apparatus by a user into and from a portable storage medium storing the user's usage data, a mounting-detecting device that detects mounting of the storage medium in the reading and writing device, a comparison device that compares the users' usage data associated with the user stored in the server and the user's usage data stored in the storage medium to determine which is a newer one, when the mounting-detecting device has detected the mounting of the storage medium in the reading and writing device, and an enabling device that enables the newer one of the users' usage data associated with the user stored in the server and the user's usage data stored in the storage medium, based on a result of the comparison.

With the arrangement of the musical tone signal-generating apparatus according to the first aspect of the present invention, it is possible to easily reflect user's settings represented by user's usage data on the apparatus by the simple operation of mounting a portable storage medium storing the user's usage data, and what is more, customize the settings of the apparatus as desired by retrieving the users' usage data associated with the user from a server even if the user's usage data stored in the storage medium cannot be used.

To attain the above object, in a second aspect of the present invention, there is provided a musical tone signal-generating apparatus comprising a connecting device that connects to a server storing users' usage data concerning use of the musical tone signal-generating apparatus, on a user-by-user basis, a reading and writing device that reads and writes user's usage data concerning the use of the musical tone signal-generating apparatus by a user into and from a portable storage medium storing the user's usage data, a removal-detecting device that detects whether an instruction has been issued for removing the storage medium from the reading and writing device, and an update request-transmitting device that transmits a request for updating the users' usage data associated with the user stored in the server such that the users' usage data associated with the user stored in the server becomes identical with the user's usage data stored in the storage medium, when the removal-detecting device has detected that the instruction has been issued for removing the storage medium from the reading and writing device.

With the arrangement of the musical tone signal-generating apparatus according to the second aspect of the present invention, it is possible to easily update users' usage data associated with the user stored in a server by the newest user's usage data stored in a portable storage medium by the simple operation of removing the portable storage medium.

Preferably, the musical tone signal-generating apparatus further comprises an update device that updates the user's usage data stored in the storage medium based on a usage status of the musical tone signal-generating apparatus.

Also preferably, the musical tone signal-generating apparatus further comprises an update device that updates the user's usage data stored in the storage medium based on a usage status of the musical tone signal-generating apparatus.

Preferably, the users' usage data stored in the server and the user's usage data stored in the storage medium each include a user ID and version information, the musical tone signal-generating apparatus further comprising an authentication device that performs authentication with the server with respect to the user based on the user ID and the version information of the user's usage data stored in the storage medium when the mounting-detecting device detects the mounting of the storage medium in the reading and writing device.

To attain the above object, in a third aspect of the present invention, there is provided a control program executed by a musical tone signal-generating apparatus including a connecting device that connects to a server storing users' usage data concerning use of the musical tone signal-generating apparatus, on a user-by-user basis, and a reading and writing device that reads and writes user's usage data concerning the use of the musical tone signal-generating apparatus by a user into and from a portable storage medium storing the user's usage data, the control program comprising a mounting-detecting module for detecting mounting of the storage medium in the reading and writing device, a comparison module for comparing the users' usage data associated with the user stored in the server and the user's usage data stored in the storage medium to determine which is a newer one, when the mounting-detecting module has detected the mounting of the storage medium in the reading and writing device, and an enabling module for enabling the newer one of the users' usage data associated with the user stored in the server and the user's usage data stored in the storage medium, based on a result of the comparison.

To attain the above object, in a fourth aspect of the present invention, there is provided a control program executed by a musical tone signal-generating apparatus including a connecting device that connects to a server storing users' usage data concerning use of the musical tone signal-generating apparatus, on a user-by-user basis, and a reading and writing device that reads and writes user's usage data concerning the use of the musical tone signal-generating apparatus by a user into and from a portable storage medium storing the user's usage data, the control program comprising a removal-detecting module for detecting whether an instruction has been issued for removing the storage medium from the reading and writing device, and an update request-transmitting module for transmitting a request for updating the users' usage data associated with the user stored in the server such that the users' usage data associated with the user stored in the server becomes identical to the user's usage data stored in the storage medium, when the removal-detecting module has detected that the instruction has been issued for removing the storage medium from the reading and writing device.

The above and other objects, features, and advantages of the present invention will become more apparent from the following detailed description taken in conjunction with the accompanying drawings.

DETAILED DESCRIPTION OF THE PREFERRED EMBODIMENT

Figure 1:
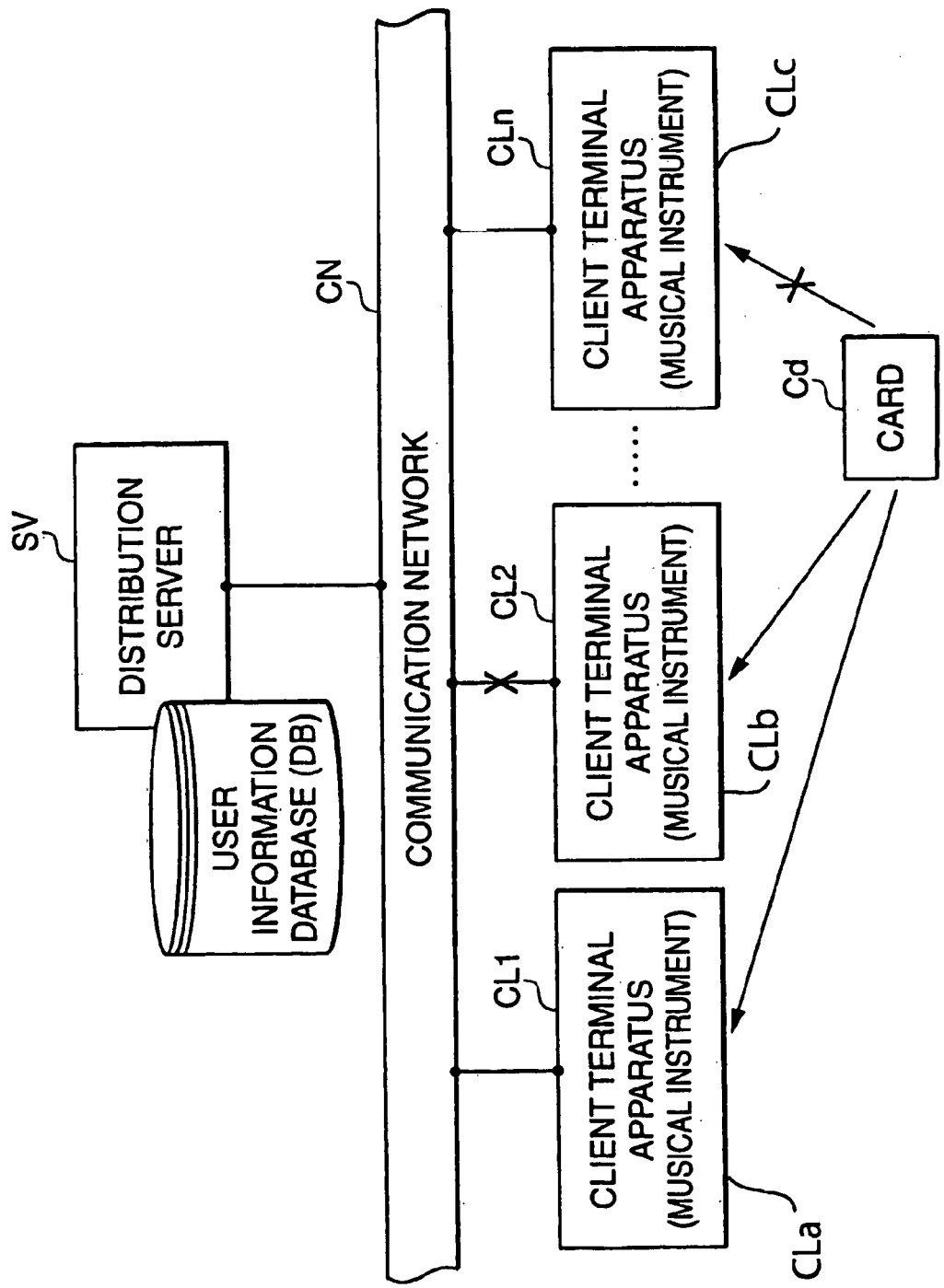
FIG. 1 is a diagram showing the outline of the whole arrangement of a users' usage data processing system including client terminal apparatuses each as a musical tone signal-generating apparatus according to an embodiment of the present invention, and a distribution server.

The present invention will now be described in detail below with reference to the drawings showing a preferred embodiment thereof. In the drawings, elements and parts which are identical throughout the views are designated by identical reference numeral, and duplicate description thereof is omitted.

FIG. 1 is a diagram showing the outline of the whole arrangement of a users' usage data processing system including client terminal apparatuses each as a musical tone signal-generating apparatus according to an embodiment of the present invention, and a distribution server. As shown in FIG. 1, this system is comprised of one or more distribution servers (a single distribution server is shown in FIG. 1, but the system may include a plurality of distribution servers) SV capable of providing users' usage data, and a plurality of client terminal apparatuses CL1, CL2, . . . , CLn.

The client terminal apparatuses CL1 to CLn are electronic musical instruments tailored for generation of musical tone signals, or information processors, such as personal computers, which are capable of generating musical tone signals similarly to the electronic musical instruments, and in the present embodiment, each of these apparatuses is referred to as a "musical instrument", a "musical terminal apparatus" or a "terminal apparatus". The client terminal apparatuses CL1 to CLn are classified into a first-type client terminal apparatus CLa which is capable of having a portable storage medium Cd, referred to as a "card", removably mounted therein and constantly connecting to the distribution server SV, a second-type client terminal apparatus CLb which is capable of having the card (portable storage medium) Cd mounted therein, but incapable of connecting to the distribution server SV, and a third-type client terminal apparatus CLc which is incapable of reading the card Cd, but capable of connecting to the distribution server SV. All of the client terminal apparatuses CL1 to CLn may be e.g. the first-type client terminal apparatuses CLa, or they may be of types of two or three of the three different types. The client terminal apparatuses CL1 to CLn will be hereinafter described on a type-by-type basis.

The distribution server SV, and the first-type and third-type client terminal apparatuses Cla and CLc are communicably interconnected by a communication network CN.

The communication network CN connecting between the distribution server SV and the client terminal apparatuses CLa and CLc (or a base station with which the terminal apparatuses CLa and CLc actually communicate) includes a local area network (LAN), and a wide area network (WAN), such as the Internet or a telephone line network. In the case of the client terminal apparatuses CLa and CLc being electronic musical instruments, the electronic musical instruments themselves may be directly connected to the communication network CN, or alternatively they may be connected to the network CN via a personal computer or the like having a communication function.

The distribution server SV is implemented by a computer, such as a personal computer or a workstation, and has a user information database (DB) provided therein. The user information DB stores users' usage data (UDs) related to the use of the musical instruments (client terminal apparatuses) CL1 to CLn on a user-by-user basis. When a user accesses the distribution server SV from any one of the client terminal apparatuses CLa, CLc, user's usage data associated with the user is stored in the users' usage data DB, or if user's usage data associated with the user has already been stored, the existing user's usage data is updated. Further, the distribution server SV is capable of supplying necessary user's usage data to each of the musical terminal apparatuses CLa and CLc in response to a request from the client terminal apparatus.

Figure 2:
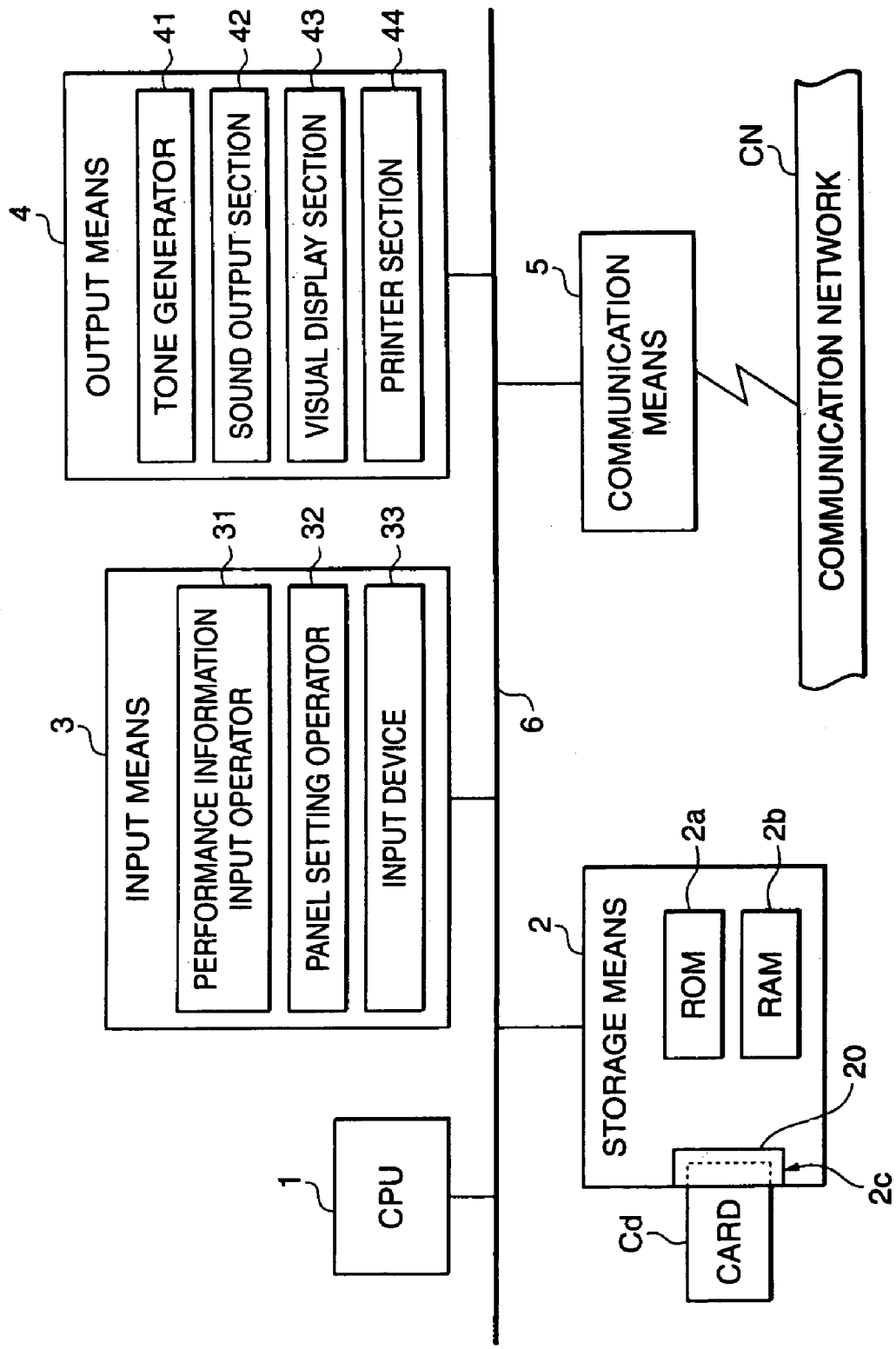
FIG. 2 is a block diagram schematically showing the hardware configuration of a first-type client terminal apparatus.

FIG. 2 is a block diagram schematically showing the hardware configuration of the first-type client terminal apparatus CLa.

The first-type client terminal apparatus CLa is comprised of a central processing unit (CPU) 1, a storage means 2, an input means 3, an output means 4, and a communication means 5, all of which are interconnected via a bus 6. The CPU 1 executes processing related to generation of musical tone signals and acquisition/update/transmission of user's usage data (UD), based on predetermined control programs.

The storage means 2 includes storage sections, such as a read-only memory (ROM) 2a storing the control programs and control data, a random access memory (RAM) 2b that has temporarily loaded therein data necessary for processing, and an external storage 2c that stores various data and programs. These storage sections can be implemented, as required, by a semiconductor memory, such as a flash memory, a magnetic storage medium, such as a flexible disk (FD), a tape device or a hard disk (HD), or an optical storage medium such as a CD, a DVD or an MO.

In the external storage 2c, a portable storage medium Cd is used to store user's usage data (UD) including settings data (Sd) indicative of the details of each user's settings associated with the use of the musical terminal apparatus CLa. The portable storage medium Cd is formed by a card-type storage medium, such as an IC card or a flash memory card, which is optionally selected as required. Each client terminal apparatus CLa includes a card reader 20 that functions as a card-driving means for reading user's usage data stored on the card Dc, or rewriting the user's usage data in accordance with a change in the usage status of the terminal apparatus CLa, or updating the user's usage data based on latest user's usage data from the distribution server SV.

The input means 3 is comprised of a performance information input operator 31, such as a keyboard, and various panel setting operators 32 including key devices, such as a character keyboard and switches, and a pointing device, such as a mouse or a tablet. Some kind of terminal apparatuses further includes an input device 33, such as a microphone and a camera, for inputting tone waveform data and image data. The output means 4 is comprised of a tone generator 41 for generating musical tone signals based on input performance information, a sound output section 42 including an amplifier and a loudspeaker for outputting the musical tone signals as sound, and a visual display section 43 including a display, such as a CRT or an LCD. Further, the output means 4 can include a printer section 44 formed by a printer or the like.

The communication means 5 is for communicating with the distribution server SV or another client terminal apparatus via the communication network CN. The communication means 5 includes a modem, not shown, or an Ethernet (registered trademark) interface, not shown. Preferably, the communication means 5 communicates with the distribution server (hereinafter simply referred to as "the server") SV via the Internet. For example, the communication means 5 is capable of transmitting user's usage data (UDc) of the musical terminal apparatus CLa to the server SV whenever necessary, and fetching user's usage data (UDc) from the server SV when the user's usage data (UDc) in the server SV is newer than user's usage data stored on the card Cd.

The second-type musical instrument (client terminal apparatus) CLb is different from the first-type musical instrument CLa in that the former is not provided with the function of the communication means 5. Further, the third-type musical instrument (client terminal apparatus) CLc is different from the first-type musical instrument CLa in that the storage means 2 is not provided with the function of reading the card Cd. However, except for these differences, the second-type and third-type musical instruments (client terminal apparatuses) CLb and CLc are identical in construction to the first-type musical terminal apparatus CLa, and therefore description thereof is omitted.

The server SV has an internal configuration similar to that of the first-type client terminal apparatus CLa shown in FIG. 2. The server SV has an external storage 2c in which various databases including the user information DB are constructed, so that the server SV can provide control programs and various kinds of data including the settings data (Sd) to the first-type and third-type musical terminal apparatuses CLa and CLc. The settings data (Sd) can be provided to the second-type musical terminal apparatus CLb from the first-type musical terminal apparatus CLa via the card Cd.

Figure 3:
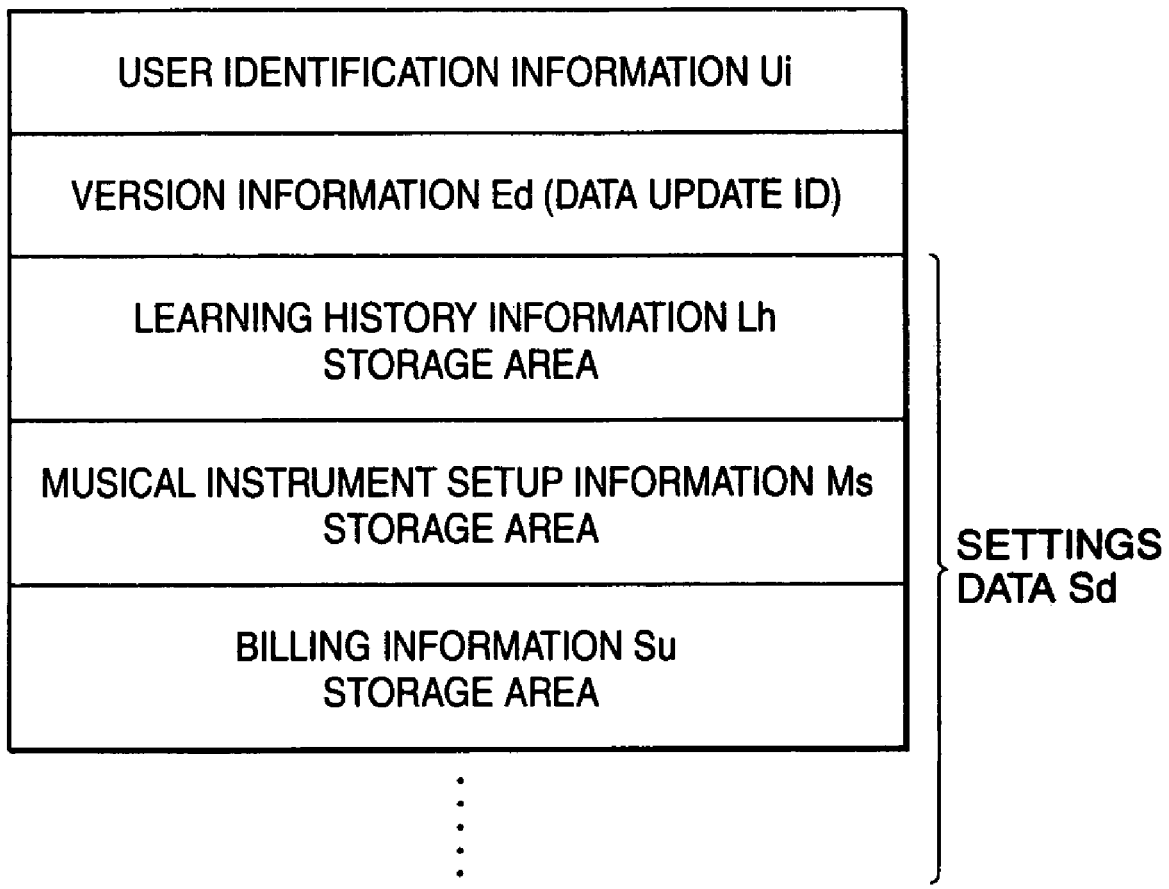
FIG. 3 is a diagram showing an example of the structure of user's usage data to be handled by the users' usage data processing system in FIG. 1.

In the users' usage data processing system according to the present embodiment, user's usage data (UDs) including settings data (Sd) related to the use of a musical instrument is stored in the user information DB of the server SV, on a user-by-user basis, and each user holds a card (portable storage medium) Cd, such as an IC card or a flash card. The card Cd stores the user's usage data (UDc) of the user himself/herself, and the user is allowed to set up a desired musical terminal apparatus specifically for the user's own use at any time using the settings data (Sd) contained in the user's usage data (UDs). FIG. 3 shows an example of the structure of the user's usage data handled in the present system.

As shown in FIG. 3, the user's usage data UD of each user is comprised of user identification information Ui, version information Ed, and settings data Sd related to the use of a musical instrument by the user. The users' usage data UD of all the users are stored in the user information DB in the server SV. The subscript "s" is added, as required, to each of the reference symbols (UD, Ed, etc.) representative of the user's usage data and the data elements thereof stored in the user information DB. On the other hand, each user's card Cd stores all or a necessary part of the user's usage data UD of a user. The subscript "c" is added, as required, to each of the reference symbol "UD" representative of user's usage data stored on the card Cd.

In FIG. 3, the version information Ed is indicative of the version of the user's usage data UD, and the information Ed is represented by a sequential number incremented e.g. by "1" whenever the user's usage data UD is updated, or numerical data corresponding to the updated date and time (second precision). The version information Ed is used when comparison between the user's usage data UDc stored on the card Cd and the user's usage data UDs stored in the user information DB is performed so as to determine which is newer. The version information Edc of the user's usage data UDc stored on the user's card Cd is also referred to as "data update ID".

The settings data Sd includes learning history information Lh, musical instrument setup information Ms, billing information Su, and so forth, and these pieces of information are recorded in respective predetermined storage areas in each of the card Cd and the user information DB. For example, the learning history information Lh, which is recorded in a predetermined learning history information storage area in each of the card Cd and the user information DB, contains information related to a type of curriculum for receiving training services, exercise musical compositions, grades indicative of the degree of progress of the user in learning, and so forth, which are necessary when the user utilizes the training services. The musical instrument setup information Ms, which is recorded in a predetermined musical instrument setup information storage area in each of the card Cd and the user information DB, contains user-defined tone color settings and registration data that defines the settings of a musical instrument. The billing information Su, which is recorded in a predetermined billing information storage area in each of the card Cd and the user information DB, contains the user's credit payment information, history information of purchased contents (usage data, musical composition data, musical score data, etc. for the training services), and so forth.

Figure 4:
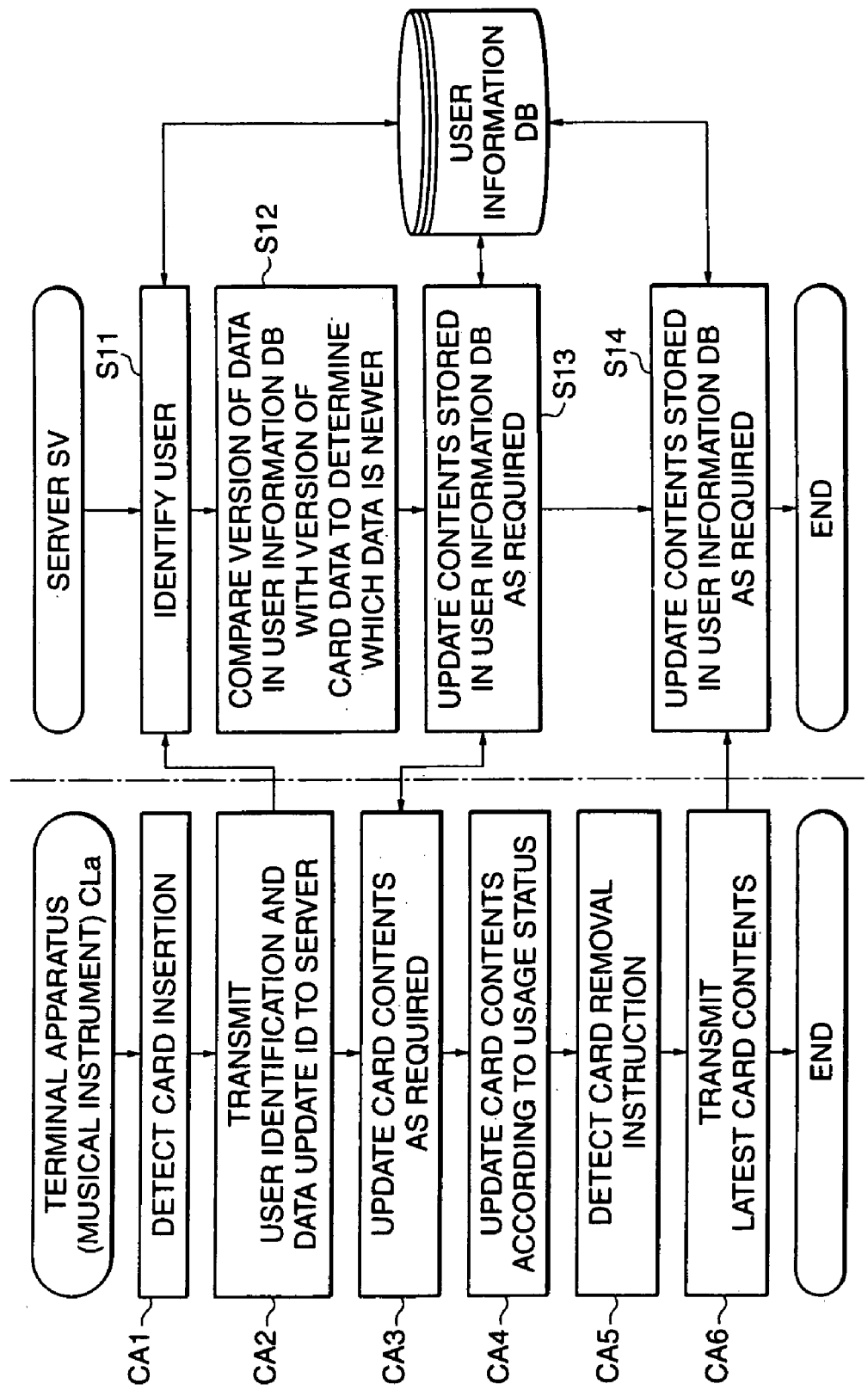
FIG. 4 is a flowchart of a process for updating user's usage data stored on a card and a user information database (DB).

FIG. 4 is a flowchart of a process for updating user's usage data stored on the card Cd and in the user information DB.

This updating process is executed by a users' usage data processing system comprised of the server SV and the first-type musical instruments (client terminal apparatuses) CLa constantly connected thereto. Hereafter, the outline of the updating process will be described, and in the description, processing or each operational step carried out by a first-type musical instrument (client terminal apparatus) CLa will be represented by a reference symbol "CA . . . ".

The user's usage data UD representative of the details of user's settings concerning the use of a musical terminal apparatus includes the settings data Sd including the learning history information Lh, the musical instrument setup information Ms, the billing information Su, and so forth, and these pieces of information are stored not only on the card Cd but also in the user information DB in the server SV. Responsive to mounting of the card Cd (step CA1), the musical terminal apparatus CLa automatically performs comparison between the user's usage data UDc stored on the card Cd and the user's usage data UDs stored in the user information DB and determines which is newer. Then, the musical terminal apparatus CLa regards the newer user's usage data as valid, and updates the older data with the newer data. For example, when the data UDs on the server SV is newer, the data UDc on the card Cd is updated with the data UDs (step CA3). Further, when the removal of the card Cd is instructed (step CA5), the data UDs on the server SV is automatically updated to the same contents as the contents of the data UDc on the card Cd (step CA6, step S14).

In the following, a more detailed description will be given of the process for updating the user's usage data stored on the card Dc and in the user information DB with reference to FIG. 4. When the user inserts (mounts) the card Cd into the card reader 20 of the storage means 2 of the first-type musical terminal apparatus CLa, the CPU 1 detects the insertion of the card Cd, and reads out the user's usage data UDc stored on the card Cd into the RAM 2b of the storage means 2 (step CA1). Then, the user identification information Ui and the data update ID in the user's usage data UDc read out are transmitted to the server SV (step CA2).

The server SV identifies the user as a sender based on the received user identification information Ui, and fetches the version information Eds of the user's usage data UDs from the user information DB (step S11). Then, the server SV performs comparison between "the version of the user's usage data UDs stored in the user information DB" indicated by the version information Eds and "the version of the card data" indicated by the data update ID (version information Edc of the user's usage data UDc stored on the card Cd), and determines which is newer (step S12). The user's usage data UDs in the user information DB is updated, as required, based on the result of the comparison (step S13). For example, when "the version of the card data" is newer, the contents of the user's usage data UDs stored in the user information DB are updated based on the user's usage data UDc on the card Cd mounted in the musical terminal apparatus CLa.

On the other hand, in the musical terminal apparatus CLa, "the version of the user's usage data UDs stored in the user information DB" is acquired, and comparison between the acquired version and "the version of the card data UDc" is performed to determine which is newer. The card contents read out into the RAM 2b, i.e. the user's usage data UDc is updated, as required, based on the result of the comparison (step CA3). For example, when "the version of the user's usage data UDs stored in the user information DB" is newer, the user's usage data UDc stored in the RAM 2b is updated based on the user's usage data UDs received from the server SV.

Thereafter, based on the user's usage data UDc stored as the card contents in the RAM 2b, the user uses the musical terminal apparatus CLa as desired, i.e. carries out various panel settings and input performance information by the input means 3, for example, thereby causing the output means (the tone generator and the display) 4 to output desired musical tones and displays. When the user's usage status (e.g. the learning history and the settings of the musical instrument) is changed during the use of the terminal apparatus CLa, the CPU 1 updates the contents of the user's usage data UDc based on the changed usage status (step CA4). For example, insofar as the settings data Sdc of the user's usage data UDc is concerned, when the training service that the user receives is upgraded, the learning history information Lhc is updated to information containing a type of curriculum and an exercise musical composition selected after the upgrade. Further, when the musical instrument setting, such as tone color parameters, of the musical terminal apparatus CLa is changed, the musical instrument setup information Msc is updated to values corresponding to the changed status, and when new musical composition data is purchased, the billing information Suc is updated to values after the purchase.

When the user terminates the use of the musical terminal apparatus CLa with the card Cd and inputs an instruction for removing (demounting/ejecting) the card Cd from the card reader 20 of the storage medium 2, the CPU 1 recognizes this instruction for the card removal (step CA5). At this time, the card contents (user's usage data UDc) stored in the RAM 2*b* contain the latest settings data Sdc corresponding to the usage status at the time of termination of the use of the musical terminal apparatus CLa, and therefore when the CPU 1 recognizes the removal instruction (step CA5), the version information Edc of the user's usage data UDc is updated (incremented by "1"), and the out-of-date user's usage data stored on the card Cd is overwritten with the latest user's usage data UDc. The version information Edc (updated date and time, for example) may be updated whenever the settings data Sdc of the user's usage data UDc is updated. Then, when the latest user's usage data UDc is transmitted to the server SV (step CA6), and the card removal is completed, the use of the musical terminal apparatus CLa with the card Cd is terminated.

On the other hand, the server SV updates the contents of the user's usage data UDs stored in the user information DB, as required, based on the data UDc received from the musical terminal apparatus CLa (step S14), followed by terminating its operation responding to the access from the musical terminal apparatus CLa. For example, when the training service and the new musical composition data are provided to the musical terminal apparatus CLa from the server SV, the learning history information Lhs and the billing information Sus stored in the user information DB already have content values thereof updated upon provision of the training service and the new musical composition data, and therefore they do not need updating. However, when the musical instrument setup information Msc in the musical terminal apparatus CLa is changed by the user, the musical instrument setup information Mss stored on the server SV in association with the musical instrument setup information Msc is updated based on the musical instrument setup information Msc transmitted to the server SV. Alternatively, the user's usage data UDs stored in the user information DB may be overwritten with the received user's usage data UDc.

Figure 5:
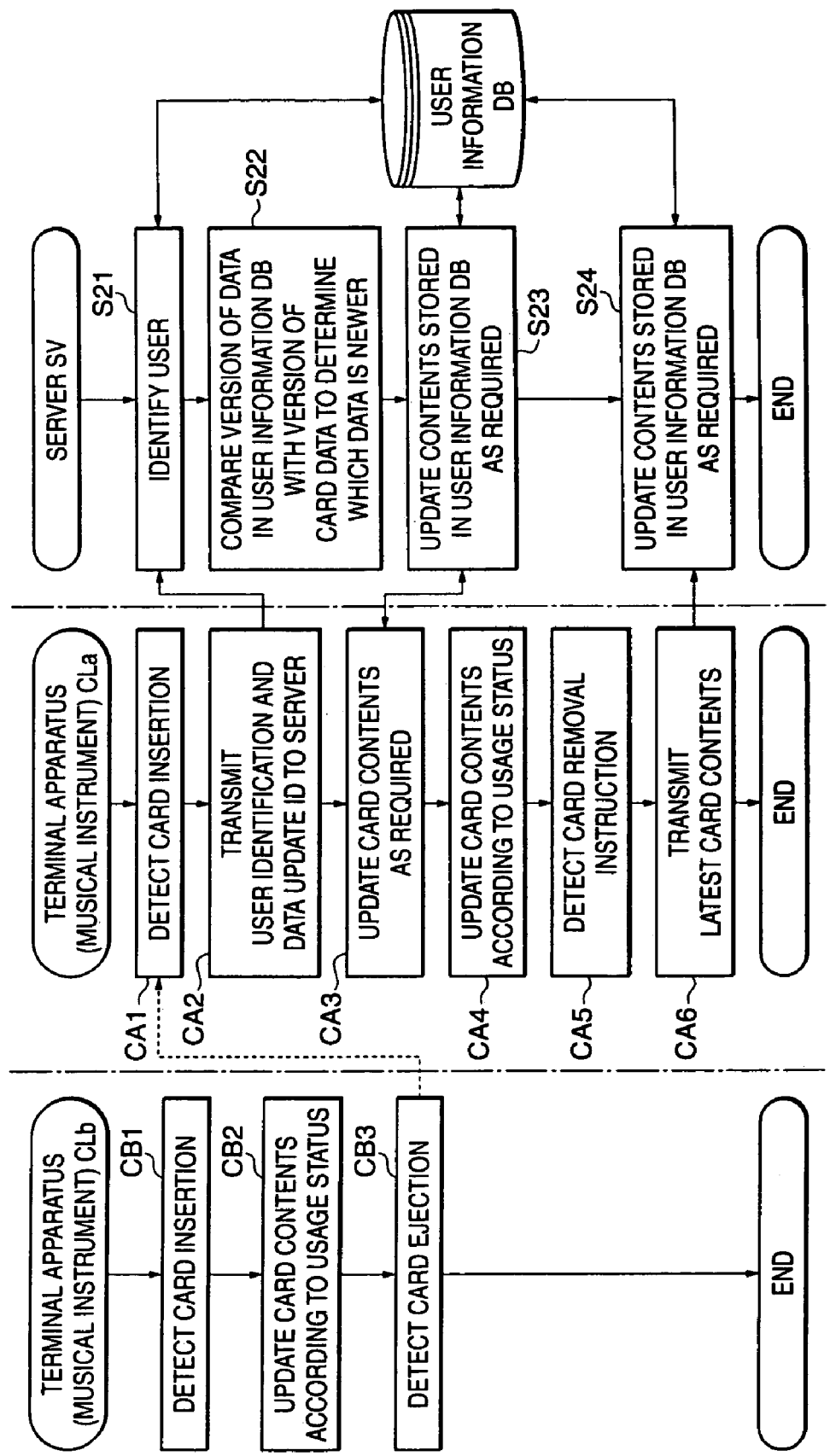
FIG. 5 is a flowchart of a first variation of the process for updating the user's usage data stored on the card and in the user information DB.

FIG. 5 is a flowchart of a first variation of the process for updating user's usage data stored on the card Cd and in the user information DB.

This updating process is executed by a users' usage data processing system comprised of the server SV, the first-type musical instruments (client terminal apparatuses) CLa constantly connected to the server SV, and the second-type musical instruments (client terminal apparatuses) CLb incapable of connecting to the server SV. Hereafter, the outline of the updating process will be described, and in the description, processing or each operational step carried out by the first-type musical instrument (client terminal apparatus) CLa will be represented by a reference symbol "CA . . . ", and processing or each operational step carried out by the second-type musical instrument (client terminal apparatus) CLb by a reference symbol "CB . . . ".

In the users' usage data processing system that executes the process shown in FIG. 5, the second-type musical terminal apparatus CLb incapable of connecting to the server SV can effectively use a card Cd by making use of the function of the first-type musical terminal apparatus CLa constantly connected to the server SV.

When a user inserts a card Cd into the second-type musical terminal apparatus CLb incapable of connecting to the server SV, the CPU 1 of the musical terminal apparatus CLb detects the insertion of the card Cd (step CB1). Then, the user uses the musical terminal apparatus CLb as desired, based on user's usage data UDc stored on the card Cd. When the usage status (e.g. the learning history and/or the musical instrument settings) of the musical terminal apparatus CLb is changed, the CPU 1 updates the contents of corresponding information in the user's usage data UDc and those of the version information Edc, based on the changed usage status (step CB2). Then, when the use of the musical terminal apparatus CLb is terminated, and the card Cd is ejected, the CPU 1 detects the card ejection (step CB3).

After having changed the contents of the card Cd during the use of the second-type musical terminal apparatus CLb, as shown in the operational flow (steps CA1 to CA6 and S21 to S24) in FIG. 5, the user can mount the card Cd in the first-type musical terminal apparatus CLa constantly connected to the server SV (more specifically, the user removes the card Cd from the second-type musical terminal apparatus CLb, and then mounts the same in the first-type musical terminal apparatus CLa), to thereby update the user's usage data UDs stored in the user information DB of the server SV, based on the user's usage data UDc stored on the card Cd. In FIG. 5, the operational steps CA1 to CA6 executed by the musical terminal apparatus CLa correspond to the respective steps represented by the identical reference symbols in FIG. 4, and the steps S21 to S24 executed by the server SV correspond to the respective steps S11 to S14 in FIG. 4. In other words, when the first-type musical terminal apparatus CLa is used after the second-type musical terminal apparatus CLb has been used with the card Cd, the process for updating the user's usage data UDs is executed according to the same procedure as that of the updating process described with reference to FIG. 4.

In the following, a brief description will be given of the updating processes executed by the server SV and the first-type musical instrument (client terminal apparatus) CLa constantly connected thereto, with reference to FIG. 5. When insertion of the card Cd, which has been removed from the second-type musical terminal apparatus CLb after using the same, into the first-type musical terminal apparatus CLa is detected (step CA1), the user's usage data UDc as the contents of the card Cd is read out into the RAM 2*b*, and the user identification information Ui and the data update ID (Edc) of the data UDc are transmitted to the server SV (step CA2). The server SV identifies the user from the user identification information Ui (step S21), and performs comparison between "the version of the data stored in the user information DB" based on the version information Eds of the user's usage data UDs fetched from the user information DB and "the version of the card data" based on the data update ID (Edc), to determine which is newer (step S22).

The user's usage data UDs stored in the user information DB or the user's usage data UDc stored on the card Cd is updated, as required, based on the result of the comparison (step S23, step CA3). For example, when the contents of the card Cd have been updated during the use of the second-type musical terminal apparatus CLb as described above, and therefore the version of the card data is newer than the version of the data stored in the user information DB, the user's usage data UDs stored in the user information DB is updated based on the user's usage data UDc stored on the card Cd (step S23).

Thereafter, the user further uses the first-type musical terminal apparatus CLa, and for example, if the usage status of the terminal apparatus CLa is changed from the settings status of the user's usage data UDc on the card Cd before the current use, the settings data Sdc in the RAM 2*b* is updated (step CA4). When the use of the first-type musical terminal apparatus CLa with the card Cd is terminated, the CPU 1 recognizes an instruction for removing the card Cd (step CA5), updates the contents stored on the card Cd with the latest user's usage data UDc stored in the RAM 2b, and transmits the latest user's usage data UDc to the server SV (step CA6). The server SV updates the user's usage data UDs in the user information DB based on the latest user's usage data UDc (step S24).

Figure 6:
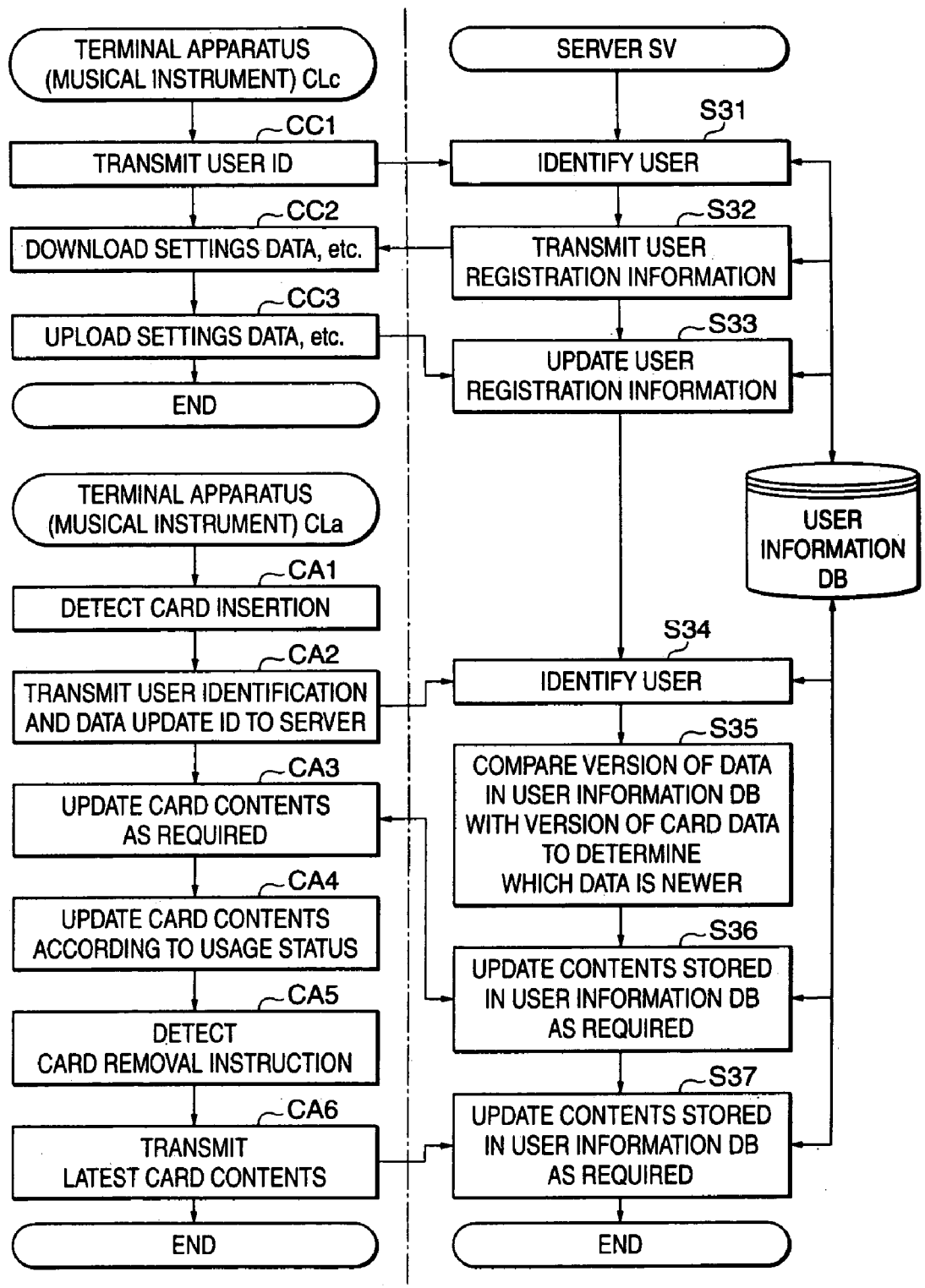
FIG. 6 is a flowchart of a second variation of the process for updating the user's usage data stored on the card and in the user information DB.

FIG. 6 is a flowchart of a second variation of the process for updating the user's usage data stored on the card Cd and in the user information DB.

This updating process is executed by a users' usage data processing system comprised of the server SV, the first-type musical instruments (client terminal apparatuses) CLa constantly connected to the server SV, and the third-type musical instruments (client terminal apparatuses) CLc incapable of using the card Cd. Hereafter, the outline of the updating process will be described, and in the description, processing or each operational step carried out by the first-type musical instrument (client terminal apparatus) CLa will be represented by a reference symbol "CA . . . ", and processing or each operational step carried out by the third-type musical instrument (client terminal apparatus) CLc by a reference symbol "CC . . . ".

In the users' usage data processing system that executes the process shown in FIG. 6, the third-type musical terminal apparatus CLc incapable of reading a card Cd can effectively use the card Cd by making use of the function of the first-type musical terminal apparatus CLa capable of using the card Cd.

In the case of using the third-type musical terminal apparatus CLc incapable of using the card Cd, when the user inputs the user's own user ID to the musical terminal apparatus CLc, the user ID is transmitted to the server SV (step CC1). The server SV identifies the user from the user ID received from the terminal apparatus CLc (step S31), and fetches information, such as settings data Sds, from the user's usage data UDs registered in the user information DB, to transmit the information to the musical terminal apparatus CLc (step S32).

In the musical terminal apparatus CLc, the CPU 1 thereof downloads the information, such as the settings data Sds, sent from the server SV (step CC2), so that the user becomes capable of using the musical terminal apparatus CLc as desired, based on the downloaded information, such as the settings data Sds. When the usage status (e.g. the learning history and/or the musical instrument settings) of the musical terminal apparatus CLc is changed during the use of the terminal apparatus CLc, the CPU 1 modifies the downloaded information, such as the settings data Sds, and uploads the modified information to the server SV (step CC3). The server SV updates the user's usage data UDs registered in the user information DB and the version information Eds associated therewith, based on the uploaded information including the settings data (step S33).

When the user uses the first-type musical terminal apparatus CLa using the card Cd after the user's usage data UDs on the server SV has been modified during the use of the third-type musical terminal apparatus CLc, the user can use the musical terminal apparatus CLa based on the user's usage data UDs and it is possible to update the user's usage data UDc on the card Cd based on the user's usage data UDs, as shown in a lower part of the flowchart in FIG. 6 (steps CA1 to CA6 and steps S34 to S37). In FIG. 6, the steps CA1 to CA6 executed by the musical terminal apparatus CLa correspond to the steps represented by the identical reference symbols in FIG. 4, and the steps S34 to S37 executed by the server SV correspond to the steps S11 to S14 in FIG. 4. In other words, when the first-type musical terminal apparatus CLa is used after using the third-type musical terminal apparatus CLc, a process for updating the user's usage data UDc stored on the card Cd, for example, is executed according to the same procedure as that of the updating process described with reference to FIG. 4.

In the following, a description will be given of the updating processes executed by the server SV and the first-type musical instrument (client terminal apparatus) CLa constantly connected thereto with reference to FIG. 6. When insertion of the card Cd is detected (step CA1) which is inserted into the first-type musical terminal apparatus CLa after using the third-type musical terminal apparatus CLc, the user's usage data UDc stored on the card Cd is read out into the RAM 2b, and the user identification information Ui and the data update ID (Edc) in the data UDc are transmitted to the server SV (step CA2). The server SV identifies the user from the user identification information Ui (step S34), and performs comparison between "the version of the data stored in the user information DB" indicated by the version information Eds of the user's usage data UDs fetched from the user information DB and "the version of the card data" indicated by the data update ID (Edc), to determine which is newer (step S35).

The user's usage data UDs stored in the user information DB or the user's usage data UDc stored on the card Cd is updated, as required, based on the result of the comparison (step S36, step CA3). For example, when the user's usage data UDs stored in the user information DB has been updated during the use of the third-type musical terminal apparatus CLc as described above, and therefore the version of the data stored in the user information DB is newer than the version of the card data, the user's usage data UDc stored on the card Cd is updated (step CA3).

Then, the user further uses the first-type musical terminal apparatus CLa, and for example, if the usage status of the terminal apparatus CLa is changed from the settings status of the user's usage data UDc on the card Cd, more specifically, if the usage status (e.g. the learning history and/or the musical instrument setting) of the musical terminal apparatus CLa is changed, the card contents in the RAM 2b are updated (step CA4) as in the above-described updating processes. Then, when the use of the first-type musical terminal apparatus CLa is terminated, the CPU 1 recognizes an instruction for removable of the card Cd (step CA5), updates the user's usage data UDc stored on the card Cd with the latest user's usage data UDc stored in the RAM 2b, and transmits the latest user's usage data UDc to the server SV (step CA6). The server SV updates the user's usage data UDs in the user information DB, as required, with the latest user's usage data UDc (step S37).

Figure 7:
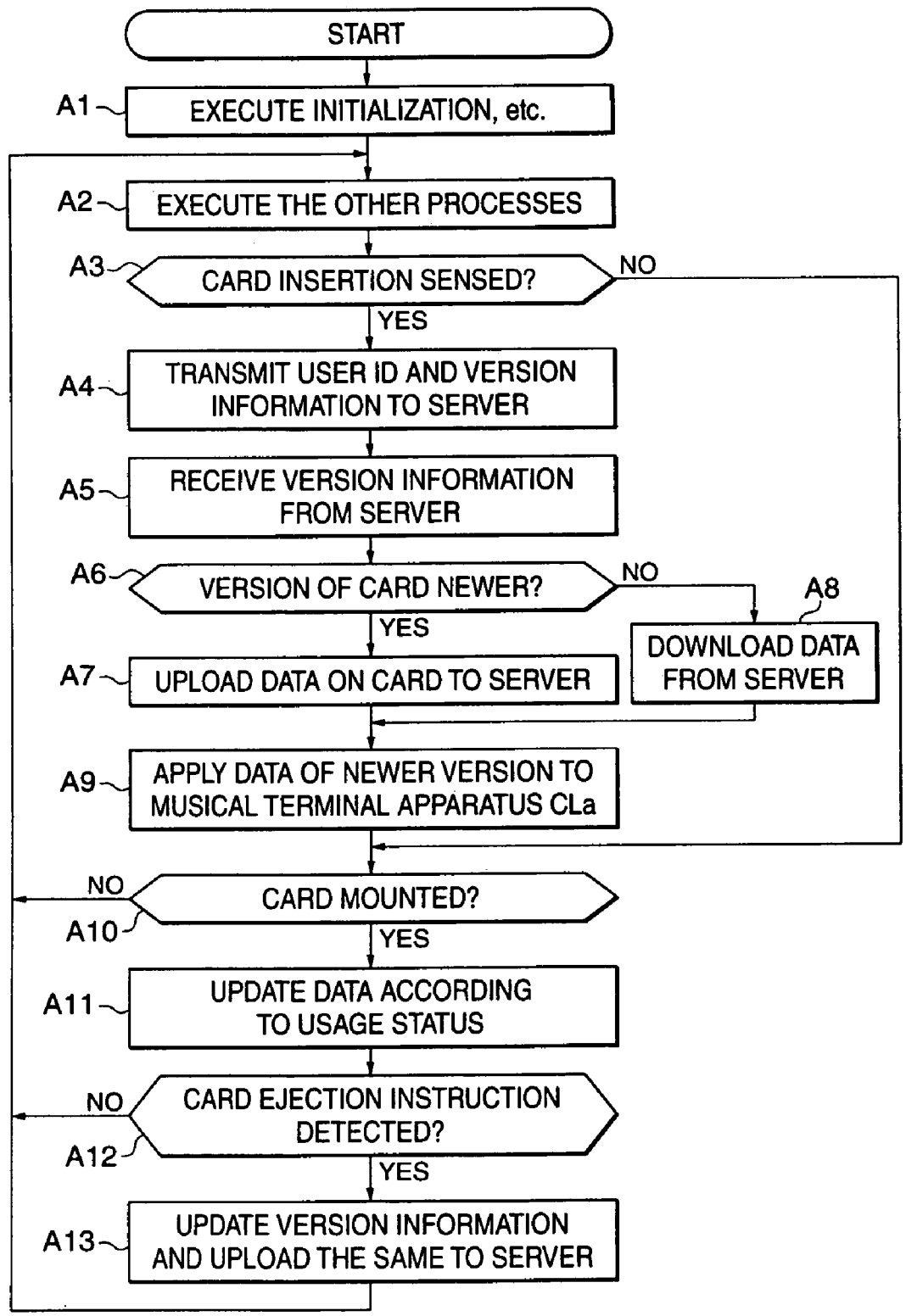
FIG. 7 is a flowchart of a main process executed by the first-type client terminal apparatus based on a first-type terminal program stored in a ROM or an external storage thereof.

FIG. 7 is a flowchart of a main process executed by the CPU 1 of the first-type client terminal apparatus CLa based on a first-type terminal program stored in the ROM 2a or the external storage 2c of the terminal apparatus CLa.

The CPU 1 of the first-type musical terminal apparatus CLa executes the main process of which the flowchart is illustrated in FIG. 7 based on the first-type terminal program stored in the ROM 2a or the external storage 2c of the terminal apparatus CLa.

When the first-type terminal program is started, first, the first-type musical terminal apparatus CLa is initialized (step A1). Then, the first-type musical terminal apparatus CLa executes "the other processes" (step A2). The term "the other processes" is used to represent processes which are not included in processing operations carried out in operational steps (steps A3 to A13) described hereinbelow.

"The other processes" generically represent ordinary processes executed for ordinary use of the musical terminal apparatus CLa. For example, "the other processes" include a musical tone-generating process for causing the output means (tone generator) 4 to form musical tone signals based on performance information corresponding to performance operations by the input means (performance operator) 3, various setting processes executed in response to setting operations by the input means (panel operators) 3, a display process by the output means (display) 4, processes for various training services, and so forth. A program end process executed in response to an end instruction given by a user is also included in "the other processes". Further, "the other processes" include a process for changing the settings data Sdc of the user's usage data UDc, which is executed in accordance with a change in the usage status of the musical terminal apparatus CLa, for changing settings of various conditions for executing the ordinary processes. In short, the above-mentioned ordinary processes are executed according to default settings (step A1), settings based on the settings data Sdc changed in the step for "the other processes" (step A2), or settings based on settings data Sdc in the latest user's usage data UDc, referred to hereinafter, which is applied to the musical terminal apparatus CLa (step A9).

Then, it is determined whether or not a card Cd has been inserted (step A3). If the card insertion has been inserted (YES to the step A3), user's usage data UDc stored on the card Cd is read out into the RAM 2b of the storage means 2, and user identification information (user ID) Ui and version information Edc of the user's usage data UDc are transmitted to the server SV (step A4). Subsequently, when version information Eds of user's usage data UDs corresponding to the user identification information Ui in the user information DB is received from the server SV (step A5), it is determined whether or not "the version of the card data" indicated by the version information Edc is newer than "the version of the data stored in the user information DB" indicated by the version information Eds (step A6).

If the version of the card data is newer than the version of the data stored in the user information DB (YES to the step A6), the user's usage data UDc stored on the card Cd is uploaded to the server SV (step A7). On the other hand, if the version of the data stored in the user information DB is newer than the version of the card data (NO to the step A6), the CPU 1 of the musical terminal apparatus CLa requests the server SV to send the user's usage data UDs (settings data Sds) stored in the user information DB, and downloads the user's usage data UDs from the server SV into the RAM 2b of the storage means 2 to update the user's usage data UDc stored in the RAM 2b (step A8). When the user's usage data UDc has been uploaded to the server SV, or when the user's usage data UDs has been downloaded from the server SV, the user's usage data of the latest version has been stored in the RAM 2b of the storage means 2, so that the contents of settings based on the latest user's usage data are applied to the musical terminal apparatus CLa (step A9).

If it is determined that the card Cd has not been inserted (NO to the step A3), or after the latest user's usage data has been applied to the musical terminal apparatus CLa (step A9), it is determined whether or not the card Cd has been mounted in the musical terminal apparatus CLa (step A10). If the card Cd has not been mounted (NO to the step A10), the process returns to the step for "the other processes" (step A2). On the other hand, if the card Cd has been mounted (YES to the step A10), the user's usage data UDc on the card Cd is updated, as required, based on the usage status (e.g. the learning history and/or the musical instrument settings) of the musical terminal apparatus CLa (step A1 1). For example, when the user's usage data UDc (particularly, the settings data Sdc) in the RAM 2b is modified in accordance with a change in the usage status of the terminal apparatus CLa, the out-of-date user's usage data UDc on the card Cd can be updated with the user's usage data UDc in the RAM 2b. Thereafter, it is determined whether or not a card removal instruction for ejecting the card Cd has been given (step A12).

If the card removal instruction has not been given (NO to the step A12), the process returns to the step for "the other processes" (step A2). On the other hand, if the card removal instruction has been detected (YES to the step A12), the version information Edc of the user's usage data UDc is updated, whereby the update of the user's usage data UDc on the card Cd in the preceding card data-updating step (step A11) is finalized or made definite. Then, the finalized user's usage data UDc is uploaded to the server SV (step A13), followed by the process returning to the step for "the other processes" (step A2). The card data-updating step (step A11) may be provided immediately before the step A13 so as to cause the entire user's usage data UDc on the card Cd including the version information Edc to be updated in a single step when the card removal instruction is given.

Figure 8:
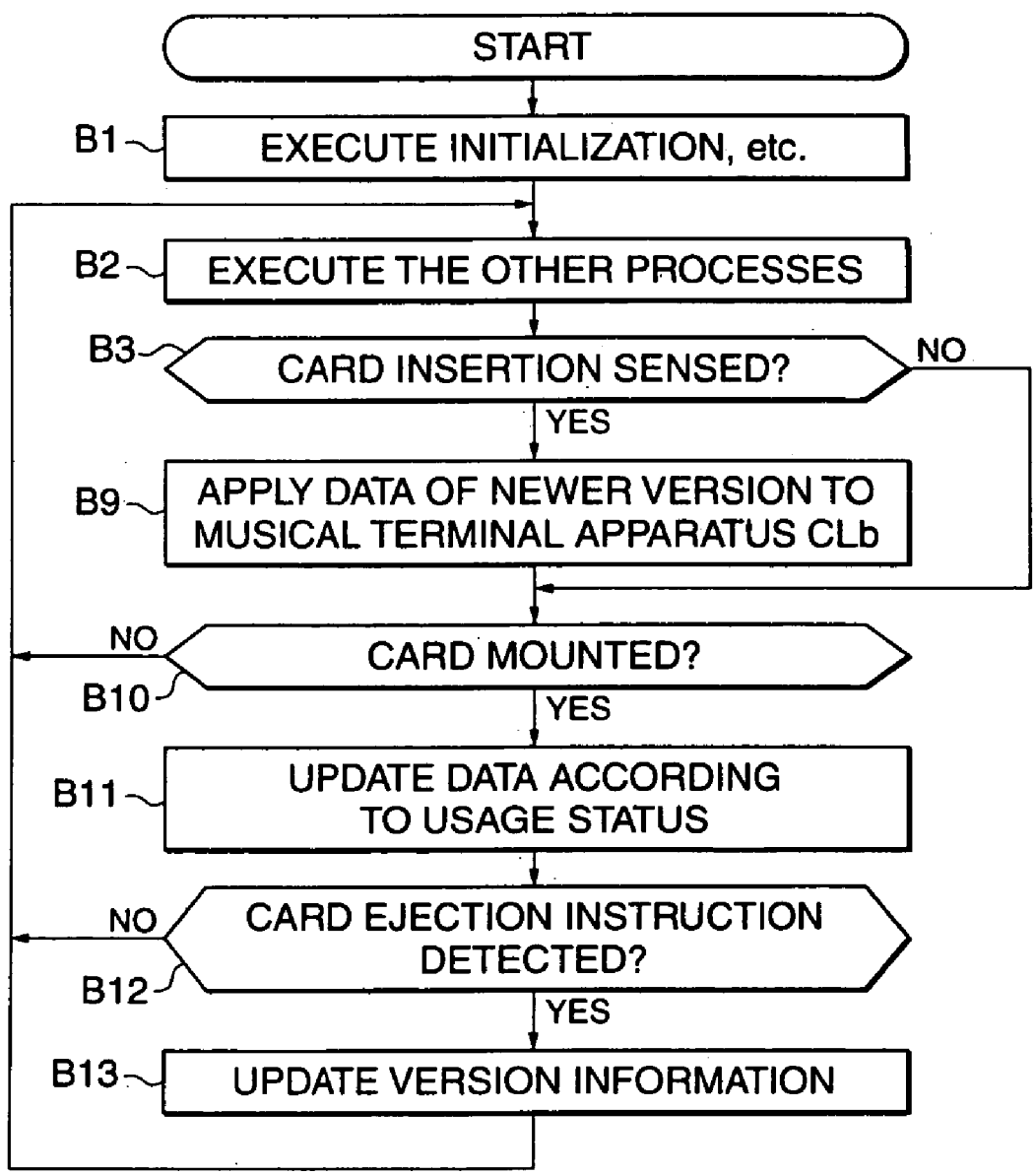
FIG. 8 is a flowchart of a main process executed by a second-type client terminal apparatus based on a second-type terminal program stored in a ROM or an external storage thereof.

FIG. 8 is a flowchart of a main process executed by the second-type client terminal apparatus CLb based on a second-type terminal program stored in the ROM 2a or the external storage 2c of the terminal apparatus CLb.

When the second-type terminal program is started, first, the second-type musical terminal apparatus CLb is initialized (step B1). Then, similarly to the first-type musical terminal apparatus CLa, the musical terminal apparatus CLb executes "the other processes" (step B2). Then, it is determined whether or not a card Cd has been inserted (step B3). If it is determined that the card insertion has been inserted (YES to the step B3), the settings based on user's usage data UDc stored on the card Cd are applied to the musical terminal apparatus CLb (step B9). If it is determined that the card insertion has not been inserted (NO to the step B3), or after the user's usage data UDc stored on the card Cd has been applied to the musical terminal apparatus CLb (step B9), it is determined whether or not the card Cd has been mounted in the musical terminal apparatus CLb (step B10). If the card Cd has not been mounted (NO to the step B10), the process returns to the step for "the other processes" (step B2).

On the other hand, if the card Cd has been mounted (YES to the step B10), the settings data Sdc of the user's usage data UDc stored on the card Cd, which corresponds to a change in the usage status of the terminal apparatus CLb, is updated, as required, based on the usage status of the terminal apparatus CLb (step B11), and then it is determined whether or not a card removal instruction for ejecting the card Cd has been given (step B12). If the card removal instruction has not been given (NO to the step B12), the process returns to the step for "the other processes" (step B2). On the other hand, if the card removal instruction has been given (YES to the step B12), the version information Edc of the user's usage data UDc is updated (step B13), followed by the process returning to the step for "the other processes" (step B2).

Figure 9:
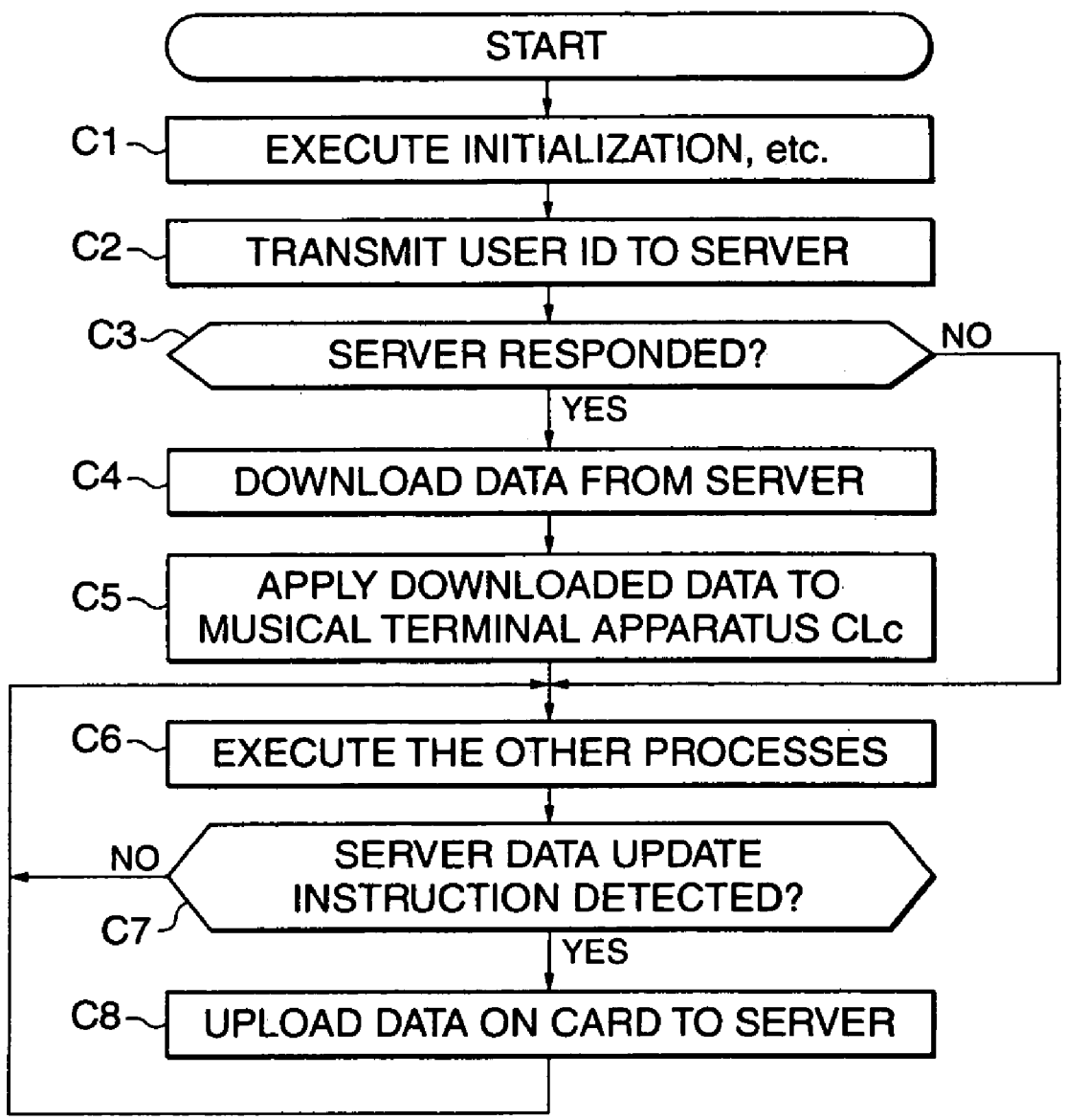
FIG. 9 is a flowchart of a main process executed by a third-type client terminal apparatus based on a third-type terminal program stored in a ROM or an external storage thereof.

FIG. 9 is a flowchart of a main process executed by the third-type client terminal apparatus CLc based on a third-type terminal program stored in the ROM 2a or the external storage 2c thereof.

When the third-type terminal program is started, first, the third-type musical terminal apparatus CLc is initialized (step C1). This initialization includes a process for inputting a user ID corresponding to the user identification information Ui of the user's usage data UDc stored on the card Cd to the musical terminal apparatus CLc in response to panel operations by a user. After the terminal apparatus CLc has been initialized, the inputted user ID is transmitted to the server SV (step C2).

Then, it is determined whether or the server SV has responded (step C3). If the server SV has responded (YES to the step C3), the settings data Sds and like information of user's usage data UDs stored in the user information DB in association with the user are downloaded to the musical terminal apparatus CLc (step C4), and the settings based on the downloaded user's usage data UDs are applied to the musical terminal apparatus CLc (step C5).

If it is determined in the server response determination step (step C3) that the server SV has not responded (NO to the step C3), i.e. when no response has been received from the server SV within a predetermined time period after the transmission of the user ID, or when information indicating that there is no data associated with the user has been received from the server SV, or after the user's usage data UDs has been applied to the musical terminal apparatus CLc (step C5), the program proceeds to a step C6 for "the other processes".

Similarly to "the other processes" (steps A2 and B2) in the first-type and second-type terminal programs, "the other processes" (step C6) represent ordinary processes executed for ordinary use of the musical terminal apparatus CLc based on default settings (step C1), settings based on application of the user's usage data UDs from the server SV (step C5), or new settings of the musical terminal apparatus CLc updated in accordance with a change in the usage status in "the other processes" (step C6). The ordinary processes include a tone generating process executed in response to performance operations, and other various processes.

Then, it is determined whether or not an instruction has been given for updating information of the user's usage data UDs stored in the user information DB of the server SV in accordance with a change in the usage status of the musical terminal apparatus CLc (step C7). If the instruction for updating the information has not been given (NO to the step C7), the program returns to "the other processes" (step C6). On the other hand, if the instruction for updating the information has been given (YES to the step C7), the present settings (corresponding to the settings data Sdc of the user's usage data UDc) of the musical terminal apparatus CLc set according to the usage status thereof is uploaded to the server SV (step C8), followed by the program returning to "the other processes" (step C6).

Figure 10:
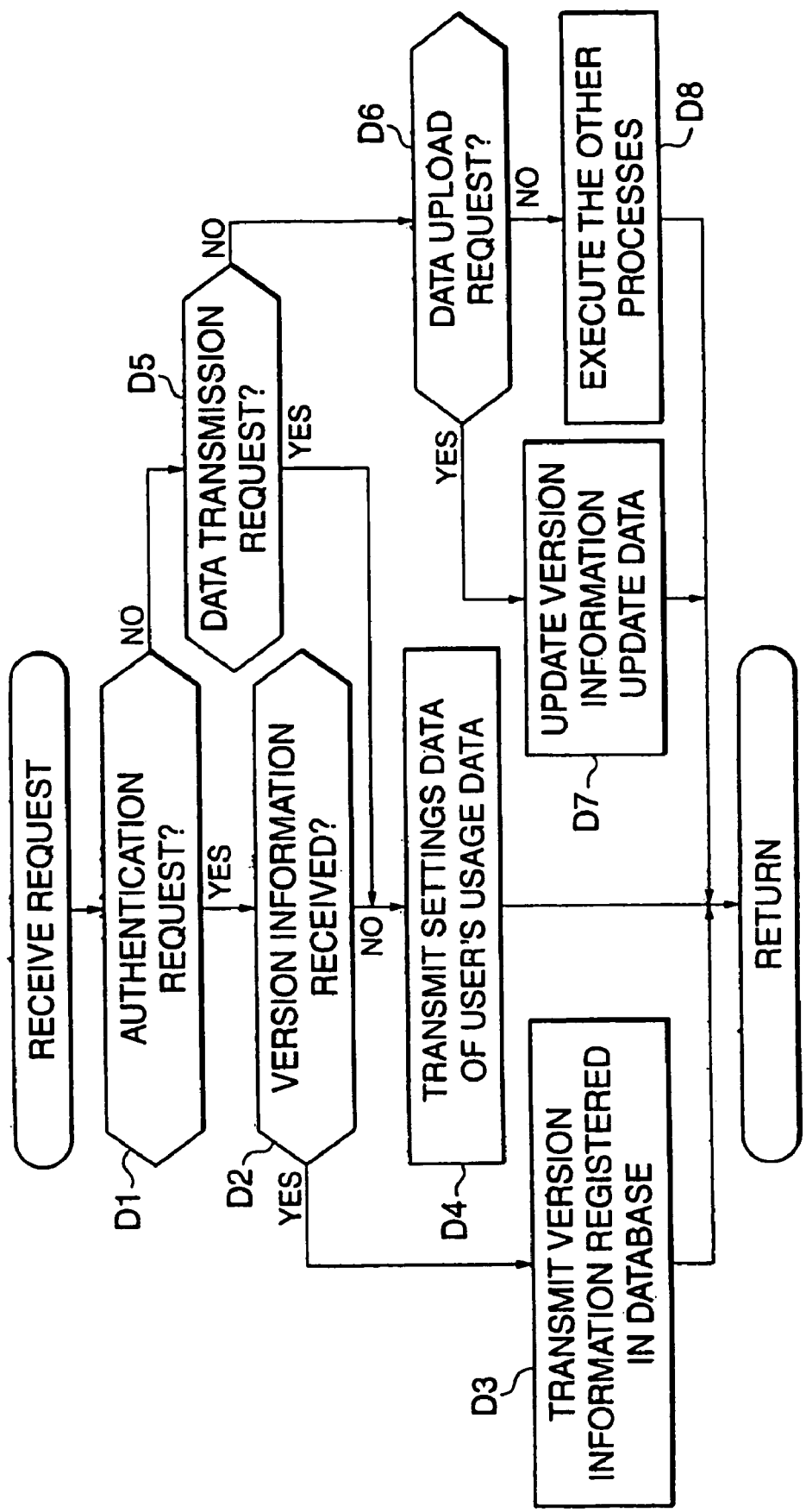
FIG. 10 is a flowchart of a main process executed by the server based on a server program stored in a ROM or an external storage thereof.

FIG. 10 is a flowchart of a main process executed by the server SV based on a sever program stored in the ROM 2a or the external storage 2c thereof.

When the sever program is started in response to a request from a first-type or third-type musical terminal apparatus CLa or CLc, first, it is determined whether or not the request is an authentication request sent at the start of an access to the server SV (step D1). If the request is the authentication request (YES to the step D1), it is determined whether or not the version information Edc of user's usage data UDc has been received (step D2).

It is assumed here that at the start of the access, the first-type musical terminal apparatus CLa transmits version information Edc together with the user ID based on user's usage data UDc stored on the card Cd of the user who sent the request. When having received the version information Edc from the musical terminal apparatus CLa (YES to the step D2), the server SV retrieves user information DB registered in the user information DB, using the user ID, and sends the version information Eds of user's usage data UDs stored in the server SV in association with the user to the musical terminal apparatus CLa (step D3).

On the other hand, if the server SV has not received the version information Edc, i.e. when the request is an authentication request from the third-type musical terminal apparatus CLc incapable of sending version information (NO to the step D2), the settings data Sd of user's usage data UDs associated with the user registered in the user information DB is retrieved according to the user ID and sent to the musical terminal apparatus CLc (step D3). Then, after having transmitted the version information Eds or the settings data Sds to the musical terminal apparatus CLa or CLc (step D3 or D4), the server SV returns to a request wait state.

If the request is not an authentication request (NO to the step D1), it is determined whether or not the request is for data transmission (step D5). If the request has been sent from a first-type musical terminal apparatus CLa for transmission of data, such as the settings data Sds (YES to the step D5), the server SV sends the settings data Sds of the user's usage data UDs to the first-type musical terminal apparatus CLa (step D4), followed by returning to the request wait state. On the other hand, if the request is not for data transmission (NO to the step D5), it is determined whether or not the request is for data upload (step D6).

If the request is for data upload (YES to the step D6), the version information Eds or the settings data Sds of the user's usage data UDs stored in the user information DB is updated based on the version information Edc or the settings data Sdc of the user's usage data UDc uploaded from the musical terminal apparatus CLa or CLc (step D7). On the other hand, if the request is not for data upload (NO to the step D6), the other server processes are executed (step D8). The term "the other server processes" (step D8) is used to represent a process for actually providing various kinds of data and contents for training services, a new user registration process for accepting a new user from an unregistered musical terminal apparatus, and so forth. Then, after having updated the user's usage data UDs (step D7) or having executed "the other server processes" (step D8), the server SV returns to another request wait state.

As described above, according to the present embodiment, user's usage data representative of the details of settings of a musical tone signal-generating apparatus by a user himself/herself who uses the apparatus is stored in a portable storage medium, and upon mounting of the storage medium in the apparatus, comparison is performed between user's usage data stored in a server and the user's usage data stored in the storage medium, whereby which data is newer is determined. Then, the newer user's usage data is regarded as valid, and the older user's usage data is updated with the newer data. Further, for removal of the storage medium, the user's usage data stored in the server is updated, as required, to make the same identical to those of the user's usage data stored in the storage medium. As a result, the user can cause the settings status represented by the user's usage data to be reflected on the musical tone signal-generating apparatus by carrying out simple operations of mounting the storage medium and instructing removal of the storage medium. Further, when the user's usage data stored in the storage medium cannot be used, it is possible to use the user's usage data acquired from the server to thereby establish a desired settings status. Therefore, the user can easily set up any musical tone signal-generating apparatus specifically for "his or her own use" at any time.

The embodiment of the present invention described above is given only by way of example. Various changes and modifications may be made without departing from the spirit and scope of the present invention, and the present invention may be executed in various forms. For example, although in the above-described embodiment, the storage medium Cd for the card Cd is preferably implemented by a card-type storage medium, such as an IC card or a flash memory card, this is not limitative, but there may be used any suitable storage medium which can repeatedly store data, such as a flexible disk (FD), an MO, an MD, a DVD-RW, and a CD-RW. Further, a portable device equipped with a storage medium, such as a cellular phone or a PDA, may be also used as the card Cd. In this case, the portable device is connected to the above-described musical terminal apparatus CLa or CLb via communication through wiring (USB, IEEE1394, or the like) or by wireless (e.g. Bluetooth), to make use of user's usage data stored in the storage medium provided in the portable device.

Further, as for the various types of information of user's usage data (UD), information which can be managed on the server SV, such as instruction materials for use in music training services, may be updated by the server SV itself.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and therefore the program code and the storage medium in which the program code is stored constitute the present invention.

Moreover, it is to be understood that the functions of the embodiment described above may be realized not necessarily by causing the computer to read and execute the program code, but alternatively by causing an operating system (OS) running on the computer to perform part or all of the actual processing based on instructions in the program code.

Further, it is to be understood that the functions of the above described embodiment may be accomplished by writing a program code read out from the storage medium into a memory provided on an expansion card inserted into a computer or in an expansion unit connected to the computer and then causing a CPU or the like provided in the expansion card or the expansion unit to perform a part or all of the actual operations based on instructions of the program code.

Further, the programs used in the embodiment are only given to realize the functions of the embodiment on a computer, and the form of each program may be an object code, a program code executed by an interpreter, or script data supplied to an OS.

Examples of the storage medium for supplying the program code include a floppy (registered trademark) disk, a hard disk, an optical disk, a magnetic-optical disk, a CD-ROM, an MO, a CD-R, a CD-RW, DVD (DVD-ROM, a DVD-RAM, a DVD-RW, a DVD+RW), a magnetic tape, a nonvolatile memory card, and a ROM. Alternatively, the program code may be supplied from a computer, database, or the like, not shown, that is connected via the Internet, a commercial network, a local area network, or the like.

What is claimed is:

1. A musical tone signal-generating apparatus comprising:
a connecting device that connects to a server storing users' usage data concerning use of the musical tone signal-generating apparatus, on a user-by-user basis;
a reading and writing device that reads and writes user's usage data concerning the use of the musical tone signal-generating apparatus by a user into and from a portable storage medium storing the user's usage data;
a mounting-detecting device that detects mounting of the storage medium in said reading and writing device;
a comparison device that compares the users' usage data associated with the user stored in the server and the user's usage data stored in the storage medium to determine which is a newer one, when said mounting-detecting device has detected the mounting of the storage medium in said reading and writing device;
an enabling device that enables the newer one of the users' usage data associated with the user stored in the server and the user's usage data stored in the storage medium, based on a result of the comparison; and
an updating device that updates the older one of the users' usage data associated with the user stored in the server and the user's usage data stored in the storage medium, based on a result of the comparison.

2. A musical tone signal-generating apparatus according to claim 1, further comprising:
a removal-detecting device that detects whether an instruction has been issued for removing the storage medium from said reading and writing device; and
an update request-transmitting device that transmits a request for updating the users' usage data associated with the user stored in the server such that the users' usage data associated with the user stored in the server becomes identical with the user's usage data stored in the storage medium, when said removal-detecting device has detected that the instruction has been issued for removing the storage medium from said reading and writing device.

3. A musical tone signal-generating apparatus as claimed in claim 1, further comprising an update device that updates the user's usage data stored in the storage medium based on a usage status of the musical tone signal-generating apparatus.

4. A musical tone signal-generating apparatus as claimed in claim 1, wherein the users' usage data stored in the server and the user's usage data stored in the storage medium each include a user ID and version information, the musical tone signal-generating apparatus further comprising an authentication device that performs authentication with the server with respect to the user based on the user ID and the version information of the user's usage data stored in the storage medium when said mounting-detecting device detects the mounting of the storage medium in said reading and writing device.

5. A control program executed by a musical tone signal-generating apparatus including a connecting device that connects to a server storing users' usage data concerning use of the musical tone signal-generating apparatus, on a user-by-user basis, and a reading and writing device that reads and writes user's usage data concerning the use of the musical tone signal-generating apparatus by a user into and from a portable storage medium storing the user's usage data, the control program comprising:

a mounting-detecting module for detecting mounting of the storage medium in the reading and writing device;

a comparison module for comparing the users' usage data associated with the user stored in the server and the user's usage data stored in the storage medium to determine which is a newer one, when said mounting-detecting module has detected the mounting of the storage medium in the reading and writing device;

an enabling module for enabling the newer one of the users' usage data associated with the user stored in the server and the user's usage data stored in the storage medium, based on a result of the comparison; and an updating device that updates the older one of the users' usage data associated with the user stored in the server and the user's usage data stored in the storage medium, based on a result of the comparison.

6. A control program executed by a musical tone signal-generating apparatus according to claim 5, further comprising:

a removal-detecting module for detecting whether an instruction has been issued for removing the storage medium from the reading and writing device; and an update request-transmitting module for transmitting a request for updating the users' usage data associated with the user stored in the server such that the users' usage data associated with the user stored in the server becomes identical to the user's usage data stored in the storage medium, when said removal-detecting module has detected that the instruction has been issued for removing the storage medium from the reading and writing device.

* * * * *